US009665441B2

(12) United States Patent
Kolte et al.

(10) Patent No.: US 9,665,441 B2
(45) Date of Patent: May 30, 2017

(54) METHOD AND SYSTEM FOR PACKET REDUNDANCY REMOVAL

(71) Applicant: Telefonaktiebolaget L M Ericsson (publ), Stockholm (SE)

(72) Inventors: Ritesh Kolte, Stanford, CA (US); Himanshu Asnani, San Jose, CA (US); Mustafa Arisoylu, San Jose, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 32 days.

(21) Appl. No.: 14/579,987

(22) Filed: Dec. 22, 2014

(65) Prior Publication Data

US 2016/0179628 A1 Jun. 23, 2016

(51) Int. Cl.
G06F 21/00 (2013.01)
G06F 11/14 (2006.01)
(Continued)

(52) U.S. Cl.
CPC ...... *G06F 11/1453* (2013.01); *G06F 12/0875* (2013.01); *H04L 1/0041* (2013.01);
(Continued)

(58) Field of Classification Search
CPC ... H04L 9/3263; H04L 9/3265; H04L 9/3268; H04L 9/3242; G06F 12/0875
See application file for complete search history.

(56) References Cited

U.S. PATENT DOCUMENTS 9,270,592 B1 * 2/2016 Sites ............... H04L 45/7453
2009/0006855 A1 * 1/2009 Tuyls .............. H04L 9/3218
713/182
(Continued)

FOREIGN PATENT DOCUMENTS

WO 02/091668 A2 11/2002
WO 2007/026287 A1 3/2007

OTHER PUBLICATIONS

J. Postel, "User Datagram Protocol," Aug. 28, 1980, 3 pages, RFC: 768.
(Continued)

*Primary Examiner* — Brandon Hoffman
*Assistant Examiner* — Helai Salehi
(74) *Attorney, Agent, or Firm* — Nicholson De Vos Webster & Elliott LLP

(57) ABSTRACT

A method/system for removing redundancy in packets is disclosed. In one embodiment, for each of the sets of one or more consecutive bytes within the packet, the method divides the one or more consecutive bytes into a plurality of non-overlapping, consecutive segments; generates a segment feature for each of the plurality of non-overlapping, consecutive segments through application of a plurality of cryptographic hash functions with different random seeds; generates a single duplication feature based on a combination of the segment features for the plurality of non-overlapping, consecutive segments; and generates a single compressed string when a predetermined condition is met, based on a comparison of the single duplication feature and a set of stored duplication features. The method continues with sending the resulting strings in place of the packet toward the packet's destination.

18 Claims, 7 Drawing Sheets

(51) Int. Cl.
G06F 12/0875 (2016.01)
H04L 9/32 (2006.01)
H04L 1/00 (2006.01)
H04L 9/06 (2006.01)
H04L 29/08 (2006.01)
H04L 12/801 (2013.01)
H04L 29/06 (2006.01)
(52) U.S. Cl.
CPC .......... *H04L 9/0643* (2013.01); *H04L 9/3236* (2013.01); *H04L 9/3242* (2013.01); *H04L 9/3263* (2013.01); *H04L 47/10* (2013.01); *H04L 67/00* (2013.01); *H04L 69/00* (2013.01); *G06F 2212/401* (2013.01); *G06F 2212/402* (2013.01); *G06F 2212/452* (2013.01)

(56) References Cited

U.S. PATENT DOCUMENTS

| | | | | |
|---|---|---|---|---|
| 2010/0177789 | A1* | 7/2010 | Chen | H04L 63/20 370/477 |
| 2010/0329256 | A1* | 12/2010 | Akella | H04L 12/4625 370/392 |
| 2011/0176556 | A1 | 7/2011 | Guo et al. | |
| 2015/0063374 | A1* | 3/2015 | Venkatachalam Jayaraman | H04L 69/04 370/476 |

OTHER PUBLICATIONS

"Transmission Control Protocol, DARPA Internet Program Protocol Specification," Sep. 1981, 91 pages, RFC: 793, Information Sciences Institute, University of Southern California, Marina del Rey, California.
C. Hedrick, "Routing Information Protocol," Jun. 1988, 33 pages, Network Working Group, Request for Comments: 1058.
David Oran, "OSI IS-IS Intra-domain Routing Protocol," Feb. 1990, 157 pages, Network Working Group, Request for Comments: 1142.
T. Socolofsky, et al., "A TCP/IP Tutorial," Jan. 1991, 28 pages, Network Working Group, Request for Comments: 1180.
G. Malkin, et al., "RIPng for IPv6," Jan. 1997, 19 pages, Network Working Group, Request for Comments: 2080.
R. Braden, et al., "Resource ReSerVation Protocol (RSVP)—Version 1 Functional Specification," Sep. 1997, 112 pages, Network Working Group, Request for Comments: 2205.
J. Wroclawski, "The Use of RSVP with IETF Integrated Services," Sep. 1997, 33 pages, Network Working Group, Request for Comments: 2210.
J. Wroclawski, "Specification of the Controlled-Load Network Element Service," Sep. 1997, 19 pages, Network Working Group, Request for Comments: 2211.
S. Shenker, et al., "Specification of Guaranteed Quality of Service," Sep. 1997, 20 pages, Network Working Group, Request for Comments: 2212.
J. Moy, "OSPF Version 2," Apr. 1998, 244 pages, Network Working Group, Request for Comments: 2328, The Internet Society.
G. Malkin, "RIP Version 2," Nov. 1998, 39 pages, Network Working Group, Request for Comments: 2453, The Internet Society.
S. Deering, et al., "Internet Protocol, Version 6 (IPv6) Specification," Dec. 1998, 39 pages, Network Working Group, Request for Comments: 2460, The Internet Society.
K. Nichols, et al., "Definition of the Differentiated Services Field (DS Field) in the IPv4 and IPv6 Headers," Dec. 1998, 20 pages, Network Working Group, Request for Comments: 2474, The Internet Society.
S. Blake, et al., "An Architecture for Differentiated Services," Dec. 1998, 36 pages, Network Working Group, Request for Comments: 2475, The Internet Society.

J. Heinanen, et al., "Assured Forwarding PHB Group," Jun. 1999, 11 pages, Network Working Group, Request for Comments: 2597, The Internet Society.
D. Borman, et al., "IPv6 Jumbograms," Aug. 1999, 9 pages, Network Working Group, Request for Comments: 2675, The Internet Society.
D. Black, "Differentiated Services and Tunnels," Oct. 2000, 14 pages, Network Working Group, Request for Comments: 2983, The Internet Society.
K. Nichols, et al., "Definition of Differentiated Services Per Domain Behaviors and Rules for their Specification," Apr. 2001, 24 pages, Network Working Group, Request for Comments: 3086, The Internet Society.
D. Black, et al., "Per Hop Behavior Identification Codes," Jun. 2001, 8 pages, Network Working Group, Request for Comments: 3140, The Internet Society.
D. Awduche, et al., "RSVP-TE: Extensions to RSVP for LSP Tunnels," Dec. 2001, 61 Pages, Network Working Group, Request for Comments: 3209, The Internet Society.
B. Davie, et al., "An Expedited Forwarding PHB (Per-Hop Behavior)," Mar. 2002, 16 pages, Network Working Group, Request for Comments: 3246, The Internet Society.
A. Charny, et al., "Supplemental Information for the New Definition of the EF PHB (Expedited Forwarding Per-Hop Behavior)," Mar. 2002, 24 pages, Network Working Group, Request for Comments: 3247, The Internet Society.
D. Grossman, "New Terminology and Clarifications for Diffserv," Apr. 2002, 10 pages, Network Working Group, Request for Comments: 3260, The Internet Society.
F. Baker, et al., "Management Information Base for the Differentiated Services Architecture," May 2002, 116 pages, Network Working Group, Request for Comments: 3289, The Internet Society.
Y. Bernet, et al., "An Informal Management Model for Diffserv Routers," May 2002, 56 pages, Network Working Group, Request for Comments: 3290, The Internet Society.
K. Chan, et al., "Differentiated Services Quality of Service Policy Information Base," Mar. 2003, 96 pages, Network Working Group, Request for Comments: 3317, The Internet Society.
L. Berger, "Generalized Multi-Protocol Label Switching (GMPLS) Signaling Resource ReserVation Protocol-Traffic Engineering (RSVP-TE) Extensions," Jan. 2003, 42 pages, Network Working Group, Request for Comments: 3473, The Internet Society.
K. Kompella, et al., "Procedures for Modifying the Resource reSerVation Protocol (RSVP)," Oct. 2004, 7 pages, Network Working Group, Request for Comments: 3936, The Internet Society.
B. Fenner, et al., "Management Information Base for the User Datagram Protocol (UDP)," Jun. 2005, 19 pages, Network Working Group, Request for Comments: 4113, The Internet Society.
Y. Rekhter, et al., "A Border Gateway Protocol 4 (BGP-4)," Jan. 2006, 104 pages, Network Working Group, Request for Comments: 4271, The Internet Society.
S. Kent, et al., "Security Architecture for the Internet Protocol," Dec. 2005, 101 pages, Network Working Group, Request for Comments: 4301, The Internet Society.
R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.
E. Rosen, et al., "BGP/MPLS IP Virtual Private Networks (VPNs)," Feb. 2006, 47 pages, Network Working Group, Request for Comments: 4364, The Internet Society.
J. Polk, et al., "A Resource Reservation Protocol (RSVP) Extension for the Reduction of Bandwidth of a Reservation Flow," May 2006, 21 pages, Network Working Group, Request for Comments: 4495, The Internet Society.
Z. Ali, et al., "Node-ID Based Resource Reservation Protocol (RSVP) Hello: A Clarification Statement," Jun. 2006, 7 pages, Network Working Group, Request for Comments: 4558, The Internet Society.
J. Babiarz, et al., "Configuration Guidelines for DiffServ Service Classes," Aug. 2006, 57 pages, Network Working Group, Request for Comments: 4594, The Internet Society.

(56) References Cited

OTHER PUBLICATIONS

K. Kompella, et al., "Virtual Private LAN Service (VPLS) Using BGP for Auto-Discovery and Signaling," Jan. 2007, 28 pages, Network Working Group, Request for Comments: 4761, The IETF Trust.

M. Lasserre, et al., "Virtual Private LAN Service (VPLS) Using Label Distribution Protocol (LDP) Signaling," Jan. 2007, 31 pages, Network Working Group, Request for Comments: 4762, The IETF Trust.

L. Andersson, et al., "LDP Specification," Oct. 2007, 135 pages, Network Working Group, Request for Comments: 5036, The IETF Trust.

R. Coltun, et al., "OSPF for IPv6," Jul. 2008, 94 pages, Network Working Group, Request for Comments: 5340, The IETF Trust.

L. Eggert, et al., "Unicast UDP Usage Guidelines for Application Designers," Nov. 2008, 27 pages, Network Working Group, Request for Comments: 5405, IETF Trust and the persons identified as the document authors.

F. Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.

"A Technical Review of Caching Technologies", Blue Coat Systems, Inc, <v.WP-caching-Technologies-EN-v3v-1013>, 2013, 5 pages.

"Cisco Wide Area Application Acceleration Services", <http://www.cisco.com/en/US/products/ps5680/Products_Sub_Category_Home.html.>, downloaded on Dec. 19, 2014, 2 pages.

Aggarwal, et al., "EndRE: An End-System Redundancy Elimination Service for Enterprises", In Proceedings of the 7th USENIX conference on Networked systems design and implementation, (NSDI '10), 2010, 14 pages.

Anand, et al., "Packet Caches on Routers: The Implications of Universal Redundant Traffic Elimination", SIGCOMM, Aug. 17-22, 2008, 12 pages.

Anand, et al., "SmartRE: An Architecture for Coordinated Network-wide Redundancy Elimination", -SIGCOMM, Aug. 17-21, 2009, 12 pages.

Charikar, M., "Similarity Estimation Techniques from Rounding Algorithms", STOC'02, May 19-21, 2002, 9 pages.

Lumezanu, et al., "The Effect of Packet Loss on Redundancy Elimination in Cellular Wireless Networks", In Proceedings of the 10th ACM SIGCOMM conference on Internet measurement, (IMC '10), Nov. 1-3, 2010, 7 pages.

Manber, U., "Finding Similar Files in a Large File System", In Proceedings of USENIX Winter 1994 Technical Conference, Jan. 1994, 11 pages.

Manku, et al., "Detecting Near-Duplicates for Web Crawling", International World Wide Web Conference Committee, (IW3C2), WWW 2007, May 8-12, 2007, 9 pages.

Rabin, "Fingerprinting by random polynomials", Technical Report TR-15-81, Department of Computer Science, Harvard University, 1981, 14 pages.

Spring, et al., "A Protocol-Independent Technique for Eliminating Redundant Network Traffic", ACM SIGCOMM, 2000, 9 pages.

Zohar, et al., "Celleration: Loss-Resilient Traffic Redundancy Elimination for Cellular Data", In Proceedings of the Twelfth Workshop on Mobile Computing Systems & Applications, (HotMobile '12), Feb. 28-29, 2012, 6 pages.

Zohar, et al., "The power of prediction: cloud bandwidth and cost reduction", SIGCOMM'11, Aug. 15-19, 2011, 12 pages.

Emir Halepovic et al., "On the performance of Redundant Traffic Elimination in WLANs", IEEE International conference, Jun. 10, 2012, pp. 1-6.

* cited by examiner

METHOD AND SYSTEM FOR PACKET REDUNDANCY REMOVAL

FIELD OF INVENTION

The embodiments of the invention are related to the field of networking. More specifically, the embodiments of the invention relate to removing redundancy in packets for efficient transmission.

BACKGROUND

In networking, bandwidth and processing resources at each network are utilized in packet transmission. The amount of transmission correlates to the amount of bandwidth and processing resource consumed, and it is desirable to minimize transmission of and/or remove redundancy in packets prior to transmission. When packets are updated to remove redundancy, the updated packets are restored at the destination by adding back the removed redundancy so the original packets can be utilized without the end user of the packets realizing the changes of the packets during transmission.

One way to remove redundancy in packets is through caching. Caching may be generally categorized into two types. One type is object caching, which removes transmission redundancy at the object level. For example, for access hypertext transfer protocol (HTTP) content, a client sends a request for an object (e.g., file, document, image, etc.) to a server. Instead of directly retrieving the object from the server, the request is intercepted by a proxy server, which checks if the proxy server has the object in its local cache. If it has the object, the proxy server responds by sending the cached object without the server retrieving the object.

Object Caching is Most Useful in the Following Scenarios:
The transmitted content does not change much;
The transmitted content can be pre-populated prior to users trying to access it; and/or
The transmitted content needs to be accessed by multiple users.

Object caching is typically limited to specific protocols, and if a byte changes, the whole object has to be retrieved again. Thus, if the transmitted content is not static, another type of caching, byte caching, may be utilized. Byte caching is a protocol-independent bidirectional caching technique that functions by looking for a common sequence of data. If any duplicate is found, the duplicate data is removed from the byte sequence, and in its place, a token is added. Byte caching is useful in accelerating traffic, and it may be used along with object caching to further accelerate specific protocols. Byte caching looks for repetition of exact sequences of data, and if an exact match is not found, byte caching does not compress the data to be transmitted.

SUMMARY

A method for removing redundancy in packets is disclosed. The method includes identifying sets of one or more consecutive bytes within a packet. For each of the sets of one or more consecutive bytes within the packet, the method divides the one or more consecutive bytes into a plurality of non-overlapping, consecutive segments; generates a segment feature for each of the plurality of non-overlapping, consecutive segments through application of a plurality of cryptographic hash functions with different random seeds; generates a single duplication feature based on a combination of the segment features for the plurality of non-overlapping, consecutive segments; and generates a single compressed string when a predetermined condition is met, based on a comparison of the single duplication feature and a set of stored duplication features. The method continues with sending the resulting strings in place of the packet toward the packet's destination.

A non-transitory machine-readable medium for removing redundancy in packets is disclosed. The non-transitory machine-readable medium has instructions stored therein, which when executed by a processor, cause the processor to perform operations in a network device, the operations including identifying sets of one or more consecutive bytes within a packet. For each of the sets of one or more consecutive bytes within the packet, the operations include dividing the one or more consecutive bytes into a plurality of non-overlapping, consecutive segments; generating a segment feature for each of the plurality of non-overlapping, consecutive segments through application of a plurality of cryptographic hash functions with different random seeds; generating a single duplication feature based on a combination of the segment features for the plurality of non-overlapping, consecutive segments; and generating a single compressed string when a predetermined condition is met, based on a comparison of the single duplication feature and a set of stored duplication features. The operations also include sending the resulting strings in place of the packet toward the packet's destination.

Embodiments of the disclosed techniques provide ways for compressing a packet even when the packet contains segments that are not identical to segments in the past; thus, an approximate matching is sufficient for packet compression.

BRIEF DESCRIPTION OF THE DRAWINGS

The present invention is illustrated by way of example, and not by way of limitation, in the figures of the accompanying drawings in which like references indicate similar elements.

DETAILED DESCRIPTION

Figure 1:
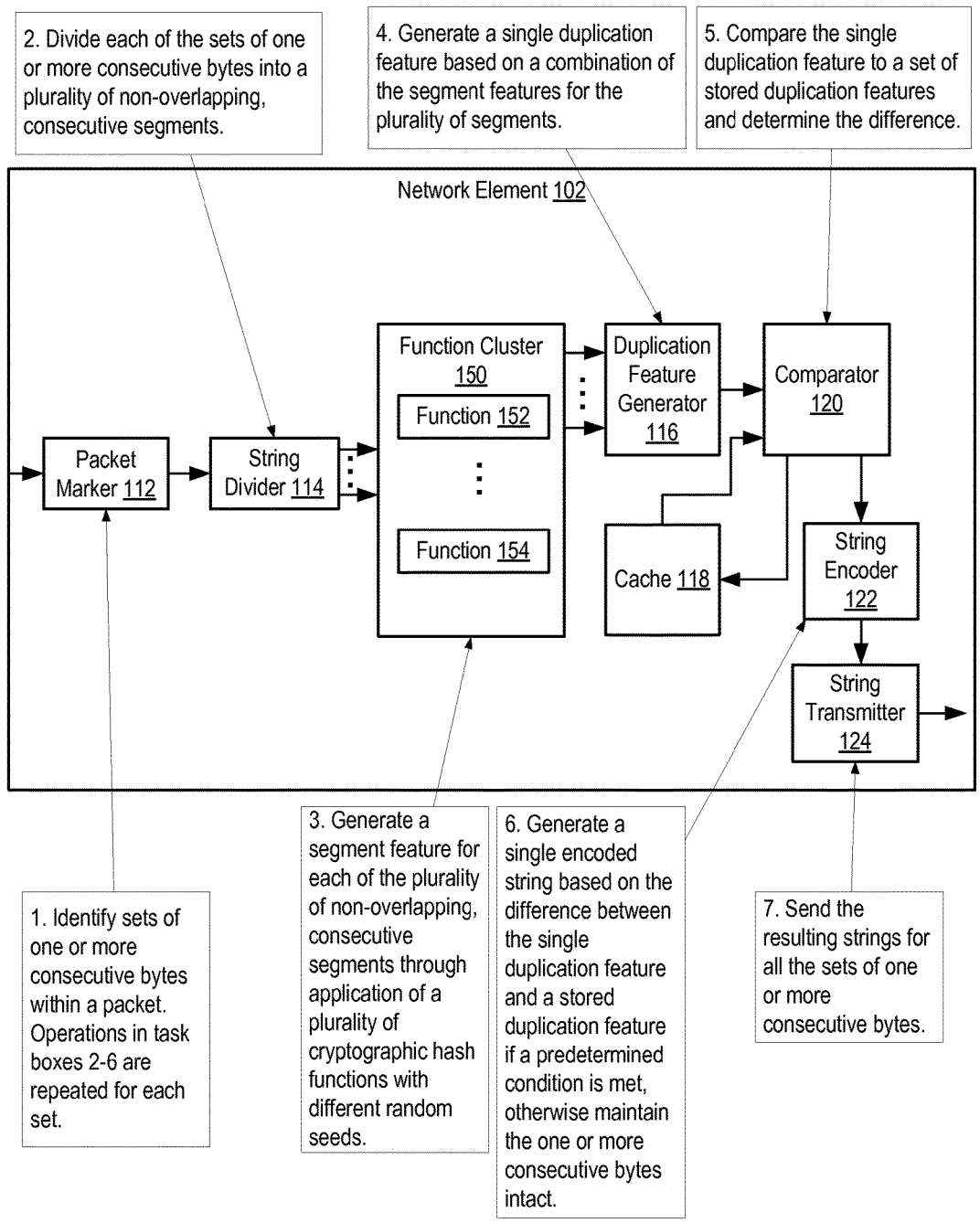
FIG. 1 is a block diagram illustrating operations of packet redundancy removal through approximate matching according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. A network device is an electronic device. A network element, as explained in more details herein below, is implemented in one or more network devices.

Removing Redundancy Through Exact Matching and its Drawbacks

For removing traffic redundancy in a network, one solution examines packet redundancy. It relies on finding exact matches between substrings in the current packet and substrings from recently processed packets that are stored in a cache. Instead of sending the current substring, a token pointing to the matched substring from the recently processed packets is sent. The cache at a transmitting network element is synchronized with the cache at a receiving network element, and the token is used to restore the replaced substring based on the substrings from the recently processed packets at the receiving network element.

Since matching of substrings directly can be computationally demanding due to their long lengths, fingerprints of the substrings may be used for matching instead of the substrings themselves. A fingerprint of a substring is formed by mapping the substring to a much shorter bit string through a fingerprinting algorithm. The fingerprint aims at efficiently and uniquely identifying the original substring for all practical purposes.

One way to remove traffic redundancy is to remove traffic redundancy sent to network links. The so called link redundancy elimination (sometimes referred to as the link RE) method can be run for each packet. A cache is used to hold the most recent packets, and an incoming packet is checked against the cache for redundancy. For every incoming packet, the method first generates a representative set of fingerprints and each fingerprint in the set is checked against the fingerprints stored in the cache. If an exact match is found, then a packet in the cache has the same content as the incoming packet in the packet region corresponding to the fingerprint. The matching region may then be expanded to find the largest matching region between the cached packet and the incoming packet, and the total repeated content is the union of all the extended matching regions corresponding to all the fingerprints. Instead of sending a matching region, a corresponding token is sent, and the token points to the region of the incoming packet. Then the cache may be updated by inserting the newly processed packet and the corresponding fingerprints. Through sending the tokens over the network links instead of the packets themselves, the traffic redundancy over the network links is removed.

Another way to remove traffic redundancy is to remove redundancy over the network as a whole. The so called network redundancy elimination (sometimes referred to as the network RE) method is designed for network wide redundancy removal. A packet can potentially be reconstructed or decoded several hops downstream from the location where it is compressed or encoded, which is a significant departure from the link RE where each compressed packet is reconstructed at the immediate downstream network element. A network RE may use a network-wide coordinated approach for intelligently allocating encoding and decoding responsibilities across network elements. A network RE may contain ingress network elements, which search for redundant content in incoming packets and encode them using previously seen packets. The network RE may also contain interior network elements, which store subsets of packets and perform decoding but not encoding. With the reduced capability, the interior network elements save processing resources.

These approaches look for substrings that have occurred exactly in the recent past. In case that an exact match is not found, no compression is performed for a substring. However, redundancy removal is possible even in the case of an approximate match. In the case of an approximate match, the difference between an incoming substring and a cached substring can be encoded and the result may be smaller than the original substring, thus the process increases the transmission efficiency. For example, say a packet contains a substring of A73FDFFF05275C342C and the "closest" substring in the cache is A73FDFFF4B275C342C, thus the substring in the cache is different from the substring in the packet only in the underlined fifth byte. Thus, the latter substring can be used to describe the former substring in a compressed manner using a representation including, for example, the following: (1) a pointer to the closest substring in the cache (e.g., pointing to the substring or fingerprint of the substring of A73FDFFF4B275C342C); (2) the location of the difference (e.g., the fifth byte); and the value of the difference (e.g., value 05).

Removing Redundancy Through Approximate Matching

FIG. 1 is a block diagram illustrating operations of packet redundancy removal through approximate matching according to one embodiment of the invention. Network element 102 is a network element that receives a packet and compresses the packet prior to sending the packet towards its destination. Task boxes 1-7 illustrate the order in which operations of approximate matching are performed according to one embodiment of the invention.

At task box 1, a packet marker 112 identifies sets of one or more consecutive bytes within a packet. Each of the sets, say M sets of one or more consecutive bytes, is a candidate for compression. Packet marker 112 identifies the positions of the bytes to divide the packet. In one embodiment, packet marker 112 divides the whole packet into the M sets, thus the whole packet is considered for compression. In another embodiment, packet marker 112 does not mark bytes in the header of the packet, and only the packet payload is considered for compression. The rationale is that the packet header may be needed for packet forwarding at a downstream network element, and compression of the packet header would disrupt the capability of the downstream network element to decode the packet. On the other hand, in some networks (e.g., point-to-point connection with no routing needed), the information in the packet header is not needed for downstream network elements to decode the packet, in which case, the whole packet may be a candidate for compression. Each or some of the M sets may have a different byte length in one embodiment. In an alternative embodiment, all the M sets have the same byte length, in which case, the byte length is denoted here to be N bytes. A byte (also referred to as an octet) contains eight bits, and two entities having the same byte length means that the two entities have the same bit length too. It is to be noted that the operations in task boxes 2-6 below are repeated for each of the sets of one or more consecutive bytes within the packet.

At task box 2, a string divider 114 divides each of the sets of one or more consecutive bytes into a plurality of non-overlapping, consecutive segments. Each of the segments may also be referred to as a substring of the packet. Each byte in the set of one or more consecutive bytes belongs to one and only one of the plurality of non-overlapping, consecutive segments. The segments may have different byte lengths in one embodiment. In an alternative embodiment, all segments of a set have the same byte length, in which case, the byte length is denoted here to be k bytes.

At task box 3, a function cluster 150 generates a segment feature for each of the plurality of non-overlapping, consecutive segments of a set of one or more consecutive bytes. The generation of the segment features is through application of a plurality of cryptographic hash functions with different random seeds. Functions 152-154 are the plurality of cryptographic hash functions with different random seeds. The cryptographic hash functions are designed to take a segment and produce a fixed length hash value. The cryptographic hash functions are designed to behave as much as possible like a random function while still being deterministic and efficiently computable. Thus, a pseudo random number generator can be used, and different random seeds can be applied for these cryptographic hash functions. In one embodiment, a cryptographic hash function with a different random seed is applied to each segment, so that no segment in a set shares the same random seed of a cryptographic hash function with another segment in the set.

One advantage of applying a plurality of cryptographic hash functions with different random seeds is that if a cached string is similar to the set of one or more consecutive bytes, but the byte order of the cached string is different from the order of the segments of the set, the cached string and the set are not considered similar as the orders of the segments cannot be shuffled in packet transmission. Using an identical hash function with the same random seed may make the hash values of an "out-of-order" cached string (with regard to segments of a set of one or more consecutive bytes) and the set appear similar, and the "false positive" is not desirable for packet redundancy removal.

At task box 4, the resulting plurality of segment features from function cluster 150 are sent to a duplication feature generator 116, which generates a single duplication feature based on the combination of the segment features for the plurality of segments. The single duplication feature is used to determine the redundancy of the set of one or more consecutive bytes. The determination is made at a comparator 120.

At task box 5, the comparator 120 compares the single duplication feature to a set of stored duplication features and determines the difference. The result of the comparison is sent to a string encoder 122. Based on the comparison of the single duplication feature and the set of stored duplication features, string encoder 122 generates a single compressed string when a predetermined condition is met at task box 6. In one embodiment, the predetermined condition is that a number of bit value differences of corresponding bits between the single duplication feature and a stored duplication feature is the smallest within the stored duplication features and no more than a predetermined number. The stored duplication feature may then be deemed to be close enough to represent the single duplication feature of the set of one or more consecutive bytes. In one embodiment, the set of stored duplication features are fingerprints of a set of stored strings. The corresponding set of stored strings may be stored in a cache 118.

If the predetermined condition cannot be met by the comparison of the single duplication feature with all of the set of stored duplication features, the set of one or more consecutive bytes (which is a byte string) is not compressed. Thus, for each of the set of one or more consecutive bytes, either the string encoder 122 does not perform compression (thus, the set is intact), or the string encoder 122 generates a single compressed string. The compressed string includes a representation of the selected stored duplication feature (i.e., the stored duplication feature with the smallest difference with respect to the single duplication feature). If the selected stored duplication feature is not exactly the same as the single duplication feature (i.e., not an exact match), the compressed string further includes the difference between the single duplication feature and the selected stored duplication feature. Thus, through task boxes 2-6, the packet is compressed to a set of strings—strings of uncompressed one or more consecutive bytes and compressed strings. Then at task box 7, instead of the packet itself, the resulting strings for all the sets of one or more consecutive bytes, compressed or not, are sent toward to the destination of the packet. At the destination, since the cache of the sending network element (network element 102 in this example) is synchronized with the cache of the destination network element, the destination network element may decode the compressed strings to its original form, and restore the packet.

Figure 2A:
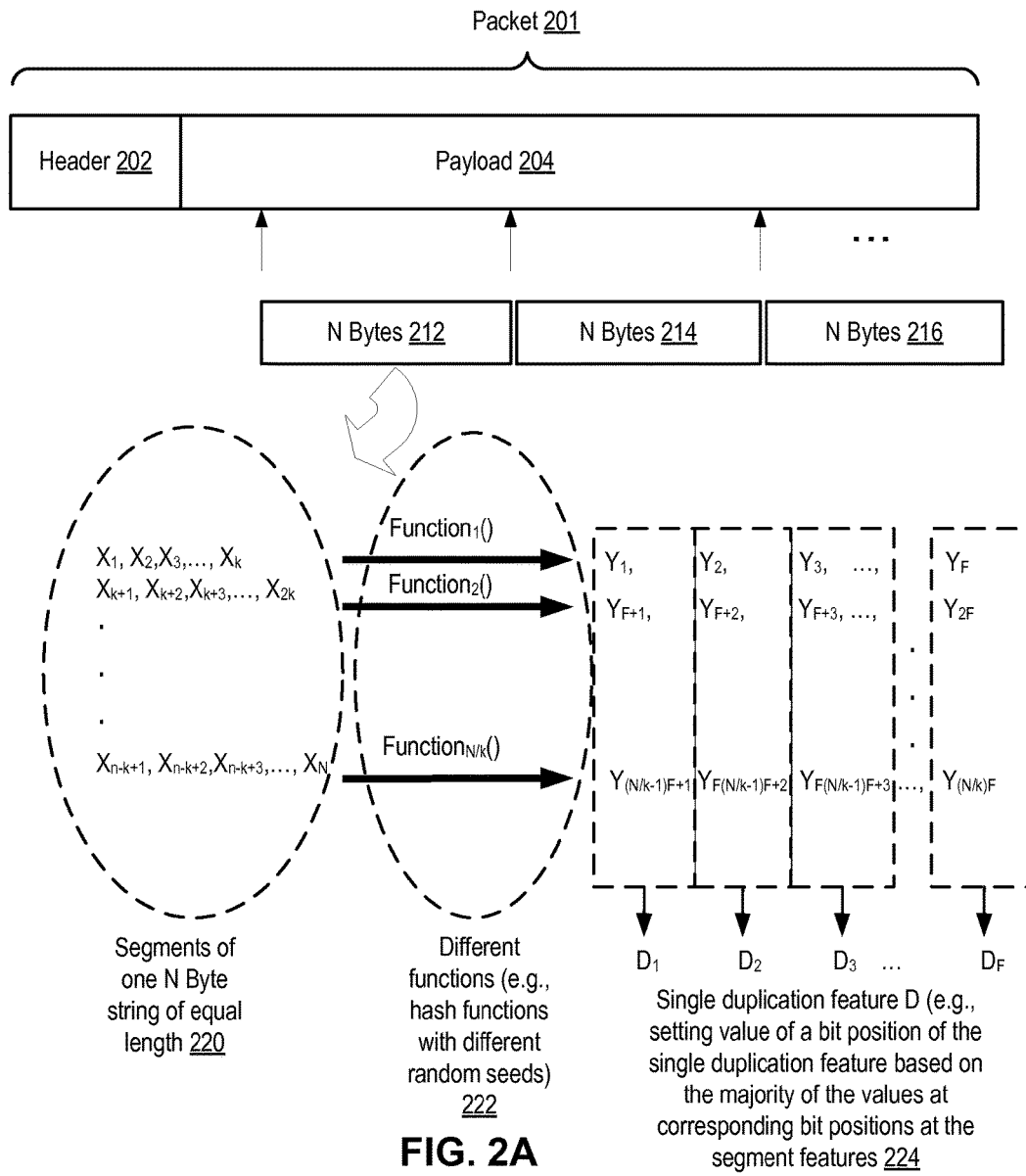
FIG. 2A is a block diagram illustrating the generation of a single duplication feature based on a combination of segment features for a plurality of segments according to one embodiment of the invention.

FIG. 2A is a block diagram illustrating the generation of a single duplication feature based on a combination of segment features for a plurality of segments according to one embodiment of the invention. The operations in FIG. 2A are an embodiment of implementation of task boxes 1-4 of FIG. 1.

Referring to FIG. 2A, packet 201 contains a header 202 and a payload 204. The packet is marked for compression, and the marking identifies sets of one or more consecutive bytes within the packet. Each of the sets of one or more consecutive bytes is a set of N consecutive bytes, where N is an integer. The sets of N consecutive bytes are in the payload 204 in this example, while an alternative embodiment may have the sets of N consecutive bytes including both the header 202 and the payload 204.

Each of the sets of consecutive N bytes is divided into a plurality of non-overlapping, consecutive segments. As illustrated at reference 220, the N bytes at reference 212 are divided into a plurality of k byte segments, and the segments are non-overlapping (e.g., the last byte of the first segment, $X_k$, is followed by $X_{k+1}$, the first byte of the second segment). In this example, these segments are byte strings of equal bit length. Each segment has applied to it a function; thus, functions $function_1(\ )$ to $function_{N/k}(\ )$ are applied to respective segments. The functions are different functions such as cryptographic hash functions with different random seeds as illustrated at reference 222.

The application of the functions results in a segment feature for each segment. For example, the application of hash functions results in hash values of a fixed number of bits. The fixed number of bits is F bits in this example, and the bit values are represented by Y, which is either one or zero. With all the segment features being of equal length in this example, the bit positions of all the segment features may be aligned respectively, and the combination of the values of each bit position may result in a value of the single duplication feature. In one embodiment, each of the bit positions of the single duplication feature is set to be one if a majority of the values at corresponding bit positions at the segment features are one; otherwise the bit positions are set to be zero. $D_1$ to $D_F$ form the resulting single duplication feature as illustrated at reference 224.

Figure 2B:
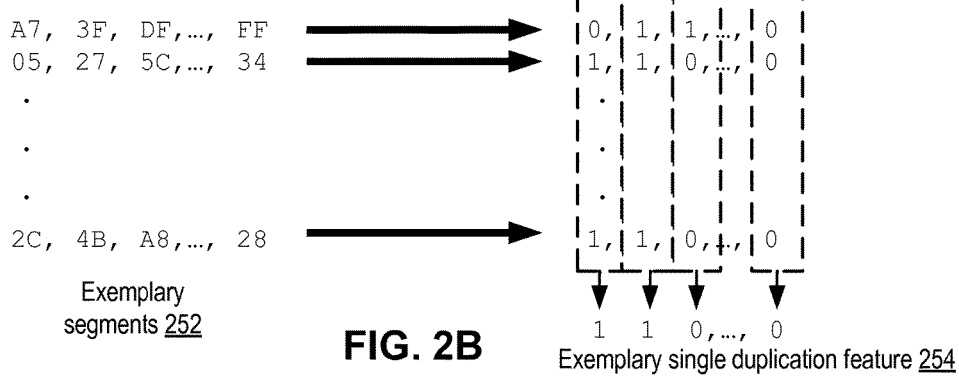
FIG. 2B is a block diagram illustrating the generation of an exemplary single duplication feature based on a combination of segment features for a plurality of segments according to one embodiment of the invention.

FIG. 2B is a block diagram illustrating the generation of an exemplary single duplication feature based on a combination of segment features for a plurality of segments according to one embodiment of the invention. The segments in FIG. 2B are embodiments of segments of the N consecutive byte string of equal length of FIG. 2A.

The exemplary segments 252 are non-overlapping, consecutive segments forming a complete string of N consecutive bytes. In this example, each segment of the N consecutive bytes contains the same number of bytes, and each byte contains eight bits expressed in a hexadecimal format. Through hashing using a plurality of cryptographic hash functions with different random seeds, each segment results in a fixed-length hash value (in bits) referred to as a segment feature. The segment features are aligned according to the relative bit positions. Thus, all the first bits of the segment features are in the first column in reference 254, all the second bits of the segment features are in the second column, and so on. Then all the bits in the same column are combined to generate a value of the bit position of the single duplication feature. The generation of the value is based on the majority of the bit values in the column in this example. If the majority of the bits are ones, as illustrated in the first two columns at reference 254, the bit position value is one. Otherwise, the bit position value is zero. As illustrated at reference 254, D1=1, D2=1, D3=0, and $D_F$=0.

Figure 3A:
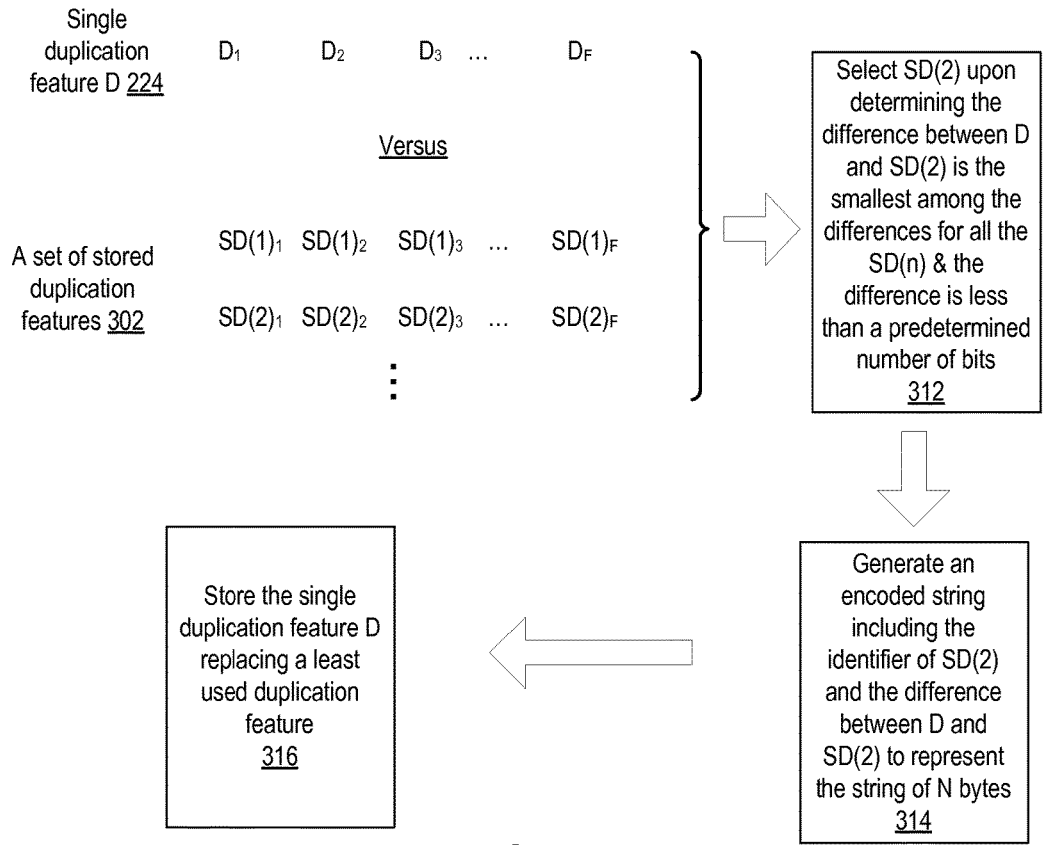
FIG. 3A is a block diagram illustrating the generation of a single encoded string based on a single duplication feature according to one embodiment of the invention.

FIG. 3A is a block diagram illustrating the generation of a single encoded string based on a single duplication feature according to one embodiment of the invention. The operations in FIG. 3A are an embodiment of implementation of task boxes 5-6 of FIG. 1. The single duplication feature D at reference 224 is compared to a set of stored duplication features 302. The stored duplication features include SD(1) and SD(2), each having a bit length equal to that of the single duplication feature D. The comparison is to find a "closest" stored duplication feature, where the number of bit value differences of corresponding bits between the single duplication feature and the stored duplication feature is the smallest, and the number of bit value difference is no more than a predetermined number at reference 312.

In one embodiment, the bit value difference is determined based on the Hamming distance between the single duplication feature and each of the set of stored duplication features. A Hamming distance between two strings of equal length is the number of positions at which the corresponding bit values are different. Finding the number of bit value differences is one way to find the closest approximation of the single duplication feature, and other approaches are possible. Embodiments of the invention are agnostic to the way to find a stored duplication feature that is the least different from the single duplication feature.

In this example, the bit value difference between the single duplication feature D and the stored duplication feature SD(2) is the smallest, and the difference is below a predetermined number of bits; thus, SD(2) is selected. SD(2) is used to generate a single compressed string that includes the identifier of SD(2), and the difference between D and SD(2) at reference 314. It is to be noted that the difference may include only the bit position without specifying the value difference, as the value difference is a bit value, which can only be one or zero. Indicating a bit position being different is sufficient for the receiving network element to know the difference (e.g., if SD(2) at the bit position is one, D would be zero at a bit position that is different). It is also to be noted that if there is an exact match between the single duplication feature D and a stored duplication feature, then the stored duplication feature, without the difference, is sufficient to represent the single duplication feature D and the corresponding one or more consecutive bytes; thus, in this case, the single compressed string for the set of one or more consecutive bytes is the identifier of the stored duplication feature itself.

The single compressed string may be transmitted toward the destination network element in the place of the corresponding N consecutive bytes. At the destination network element, it identifies SD(2) based on the identifier of SD(2). As the destination network element is synchronized with the transmitting network element with regard to the stored set of duplication features, the destination network element knows the value of SD(2). Based on the value of SD(2) and the transmitted difference between D and SD(2), the destination network element can determine the value of D. From the value of D, the destination network element can restore the compressed N consecutive bytes.

In one embodiment, the set of stored duplication features and their corresponding set of stored strings are stored in a cache at both the source and destination network elements. In an alternative embodiment, only the set of stored strings, fingerprints of which are the set of stored duplication features, are stored in the cache at both the source and destination network elements.

As the single duplication feature D is generated, the transmitting network element may consider that the corresponding N consecutive bytes are likely to be transmitted again. Thus, the transmitting network element may store the single duplication feature D, replacing a least used duplication feature in the set of stored duplication features at reference 316. In one embodiment, the corresponding stored string of the least used duplication feature is replaced by the corresponding N consecutive bytes in the cache of the transmitting network element for transmission.

Figure 3B:
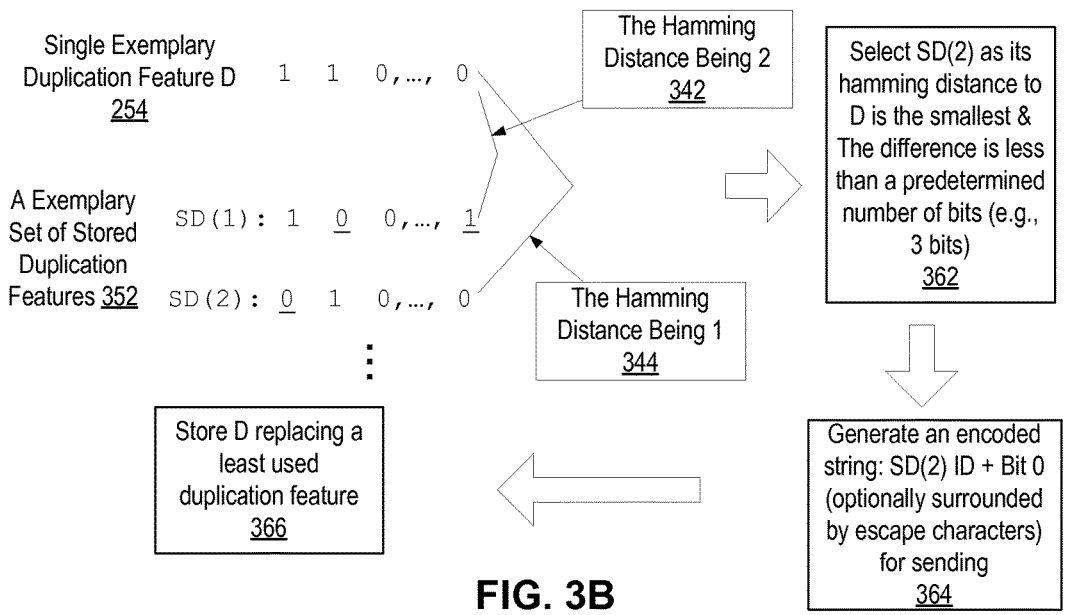
FIG. 3B is a block diagram illustrating the generation of an exemplary single encoded string based on a single duplication feature according to one embodiment of the invention.

FIG. 3B is a block diagram illustrating the generation of an exemplary single encoded string based on a single duplication feature according to one embodiment of the invention. The duplication feature D in FIG. 3B is an embodiment of the duplication feature of FIG. 3A.

Referring to FIG. 3B, the Hamming distances between the duplication feature D and SD(1), D and SD(2), D and SD(n) are computed at references 342 and 344. As illustrated, the Hamming distance between D and SD(1) is equal to two, where the bit positions that are different are underlined in FIG. 3B. The Hamming distance between D and SD(2) is equal to one, and the bit position, bit 0, is also underlined in FIG. 3B.

If there is a stored duplication feature whose Hamming distance to D is zero, the stored duplication feature SD matches D exactly, in which case the SD will be the single encoded string, and the single encoded string may include only the identifier of the exactly matching SD without the difference field (i.e., as there is no difference). In the example of FIG. 3B, it is assumed that there is no exact match of the duplication feature D in the set of stored duplication features. Since the Hamming distance of one for SD(2) is no more than that of the Hamming distance of other stored duplication features (since no exact match is assumed, the Hamming distances for the stored duplication features are larger than zero), and assuming the predetermined condition is that the Hamming distance cannot be more than three, for example, which SD(2) meets, SD(2) is selected to generate a single encoded string representing the duplication feature D at reference 364. The single encoded string includes the identifier of SD(2) and bit zero; the former of the two-tuple indicates the approximation of the duplication feature and the latter of the two-tuple indicates the bit position of the difference between the approximation and the duplication feature D.

At reference 366, the duplication feature D is stored as a new member of the set of stored duplication features SD, replacing a member of the set of existing stored duplication features SD, which is the least utilized in compression. The corresponding set of stored strings of the set of stored duplication features SD are updated too, similarly, to the stored duplication features SD.

Flow Diagrams

Figure 4:
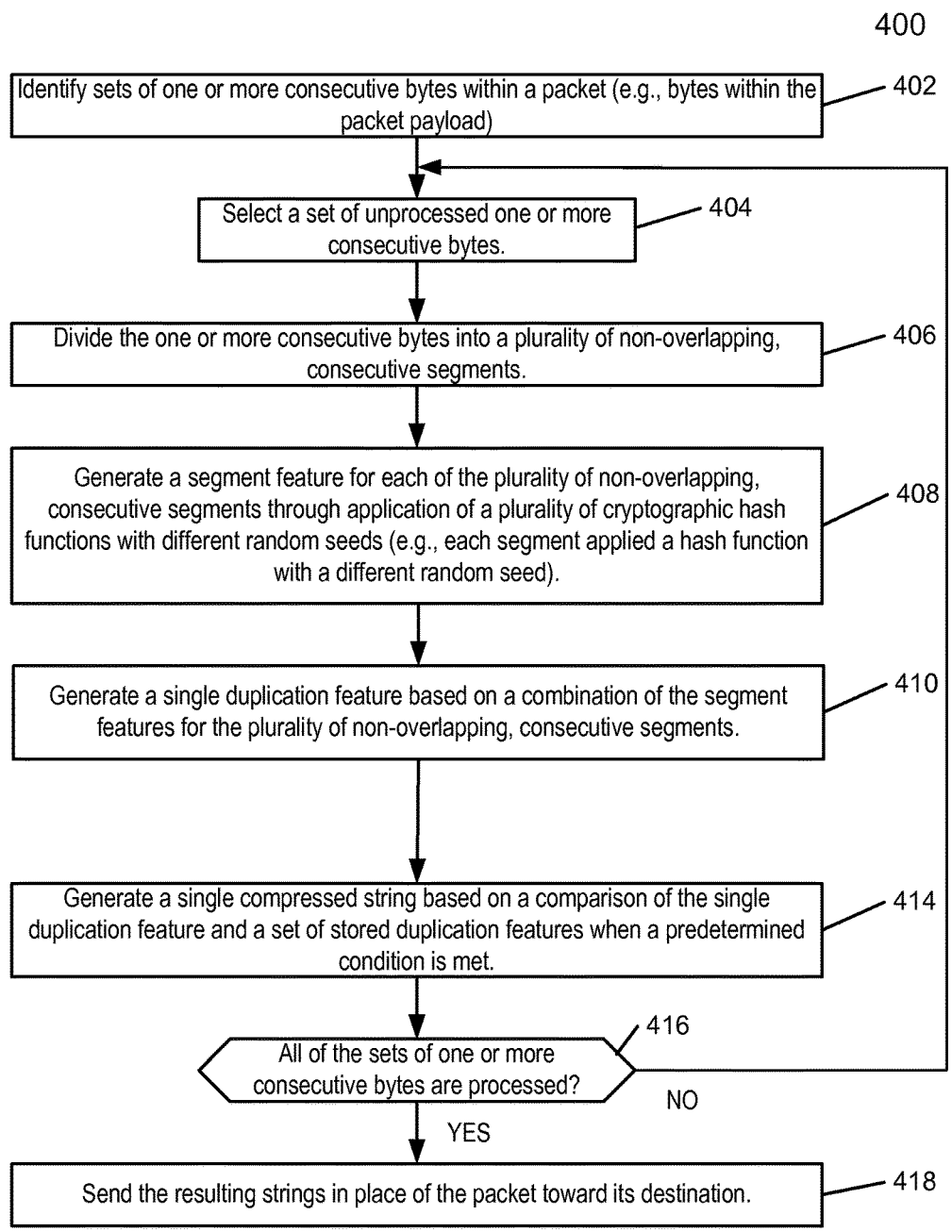
FIG. 4 is a flow diagram illustrating operations of packet redundancy removal according to one embodiment of the invention.

FIG. 4 is a flow diagram illustrating operations of packet redundancy removal according to one embodiment of the invention. Method 400 may be implemented in a network device implementing a network element such as network element 102 of FIG. 1.

Method 400 starts at reference 402, where sets of one or more consecutive bytes within a packet are identified. The sets of one or more consecutive bytes may include all the bytes of the packet in one embodiment. In an alternative embodiment, the sets of one or more consecutive bytes may include only the packet payload. In one embodiment, the sets of one or more consecutive bytes are equal in bit length.

At reference 404, a set of one or more consecutive bytes not being processed yet ("unprocessed" one or more consecutive bytes) is selected. The set of one or more consecutive bytes are divided into a plurality of non-overlapping, consecutive segments at reference 406. The plurality of non-overlapping, consecutive segments are equal in bit length in one embodiment.

Then, at reference 408, for each of the plurality of non-overlapping, consecutive segments, a segment feature is generated through application of a plurality of cryptographic hash functions with different random seeds. In one embodiment, a cryptographic hash function with a different random seed is applied to each of the plurality of non-overlapping, consecutive segments.

At reference 410, a single duplication feature is generated based on a combination of the segment features for the plurality of non-overlapping, consecutive features. In one embodiment, the combination of the segment features for the plurality of non-overlapping, consecutive segments comprises setting a value of each bit position of the single duplication feature based on values at corresponding bit positions of each of the segment features. The value of each bit position of the single duplication feature may be set to be one upon determining that a majority of the values at corresponding bit positions of the segment features are one, and the value of each bit position may be set to be zero otherwise in one embodiment.

At reference 414, a single compressed string is generated based on a comparison of the single duplication feature and a set of stored duplication features, when a predetermined condition is met. The operation is to find a closest approximation of the single duplication feature within the set of stored duplication features, and when one is found, it is used to represent the set of one or more consecutive bytes. In one embodiment, each single compressed string is surrounded by a character sequence (e.g., an escape character at each end of the string).

At reference 416, it is determined whether or not all the sets of one or more consecutive bytes are processed, and if they are, the resulting strings are sent toward the destination of the packet in place of the packet at reference 418. Otherwise, if it is determined that not all the sets of one or more consecutive bytes are processed, the method 400 returns to reference 404 to select the next set of unprocessed one or more consecutive bytes.

Figure 5:
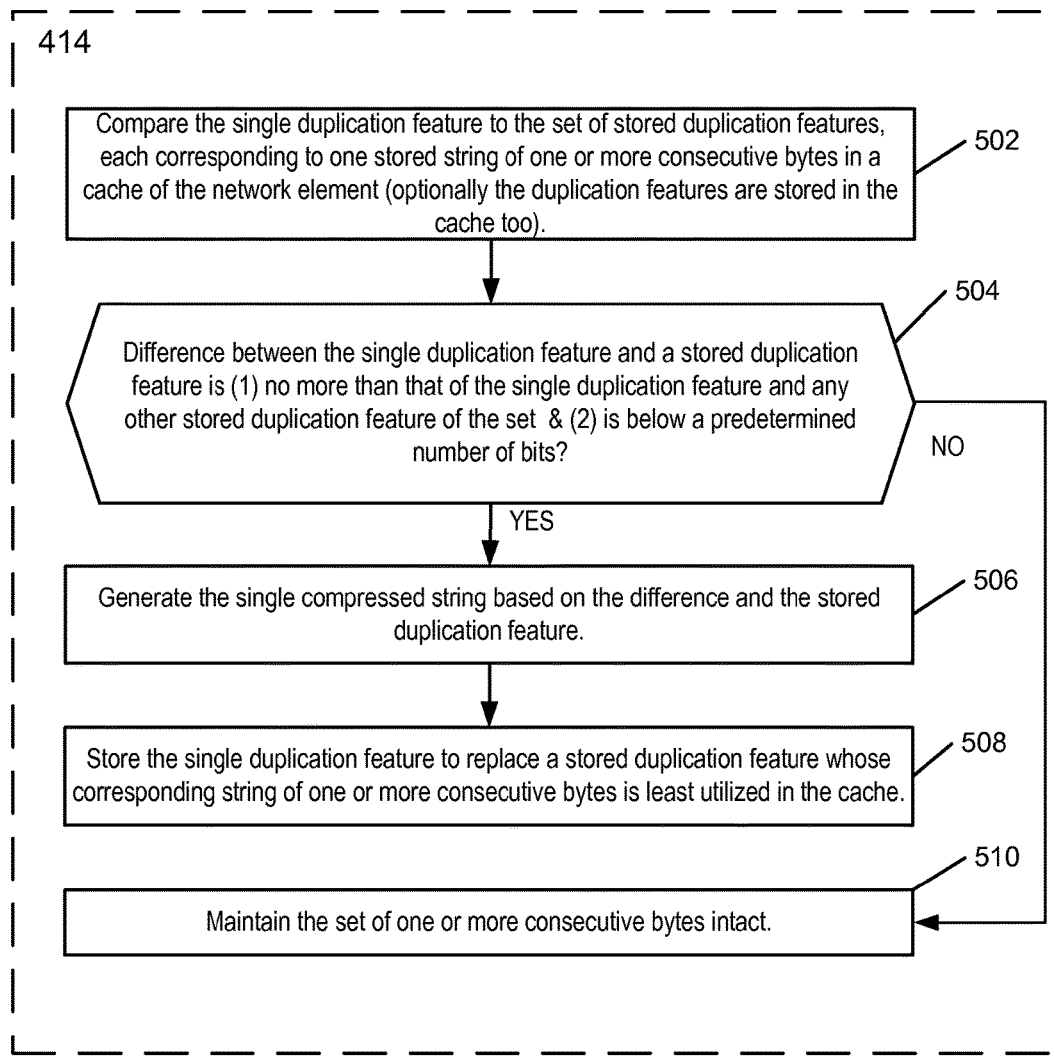
FIG. 5 is a flow diagram illustrating the generation of a single compressed string according to one embodiment of the invention.

FIG. 5 is a flow diagram illustrating the generation of a single compressed string according to one embodiment of the invention. The single compressed string is generated from a set of one or more consecutive bytes, and it is generated based on a generated single duplication feature of the set of one or more consecutive bytes. Method 500 may be an implementation of reference 414 in one embodiment.

At reference 502, the single duplication feature is compared to a set of stored duplication features. Each of the set of stored duplication features corresponds to one stored string of one or more consecutive bytes in a cache of the network element. In one embodiment, the set of stored duplication features are stored in the cache too.

At reference 504, it is determined whether a predetermined condition is met. In one embodiment, the predetermined condition is that the difference between the single duplication feature and a stored duplication feature is no more than that of the single duplication feature and any other stored duplication feature of the set, and the difference is below a predetermined number of bits. If the predetermined condition is not met, the flow goes to reference 510, and the corresponding set of one or more consecutive bytes is maintained intact (i.e., not compressed).

If the predetermined condition is met at reference 504, a single compressed string is generated based on the difference between the single duplication feature and the stored duplication feature with the smallest difference. In one embodiment, the single compressed string includes a representation of the stored duplication feature and the difference. The representation of the stored duplication feature is an identifier of the stored duplication feature in one embodiment.

At reference 508, the single duplication feature is stored to replace a stored duplication feature whose corresponding stored string of one or more consecutive bytes is the least utilized in the cache. Thus, the set of stored duplication feature is updated, reflecting that the set of one or more consecutive bytes within the packet, corresponding to the single duplication feature, is likely to be used again in the near future.

Through methods 400 and/or 500, not only a packet with sets of one or more consecutive bytes that have been transmitted in the recent past may be compressed, the packet with sets of one or more consecutive bytes that are close enough to sets of bytes transmitted in the recent past (thus the sets of bytes are stored in the cache) can also be compressed. Thus, the redundancy removal of approximate matching can be used more widely than the redundancy removal based on exact matching.

SDN and NFV Environment Utilizing Embodiments of the Invention

Embodiments of the invention may be utilized in traditional communication networks, where the data plane and control plane are integrated in a network element implemented by a network device. Embodiments of the invention may also be utilized in a SDN and NFV network containing network devices. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 6A:
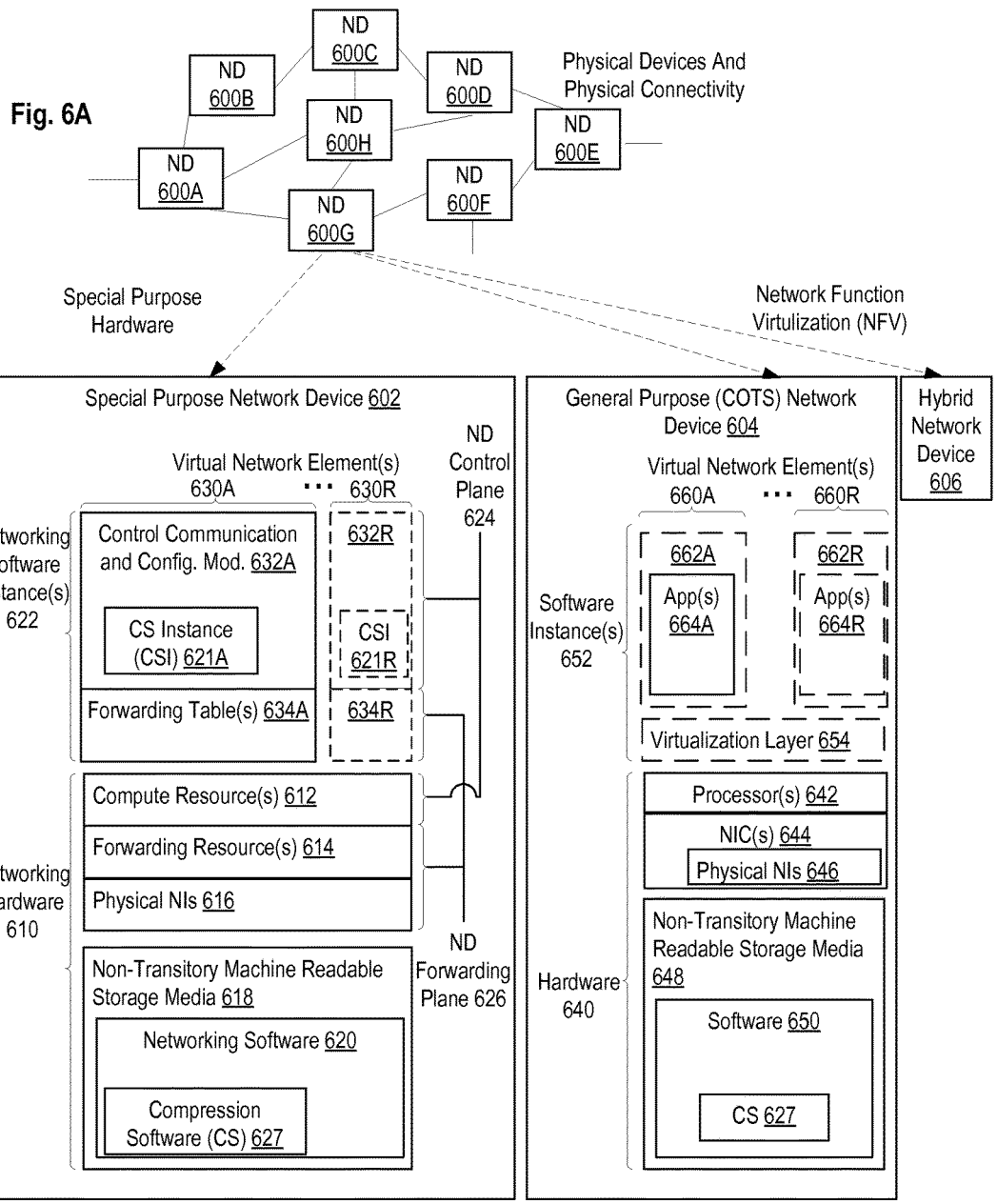
FIG. 6A illustrates connectivity between network devices (NDs) within an exemplary network, as well as three exemplary implementations of the NDs, according to some embodiments of the invention.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 600A, E, and F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application—specific integrated—circuits (ASICs) and a proprietary operating system (OS); and 2) a general purpose network device 604 that uses common off-the-shelf (COTS) processors and a standard OS.

The special-purpose network device 602 includes networking hardware 610 comprising compute resource(s) 612 (which typically include a set of one or more processors), forwarding resource(s) 614 (which typically include one or more ASICs and/or network processors), and physical network interfaces (NIs) 616 (sometimes called physical ports), as well as non-transitory machine readable storage media 618 having stored therein networking software 620, which contains compression software 627 including instructions for the approximate matching based redundancy removal as discussed herein above. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 600A-H. During operation, the compression software 627 may be executed by the networking hardware 610 to instantiate a set of one or more compression software instance 621A-R. Each of the compression software instances 621A-R, and that part of the networking hardware 610 that executes that compression software instance (be it hardware dedicated to that load balancer instance and/or time slices of hardware temporally shared by that compression software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A).

The special-purpose network device 602 is often physically and/or logically considered to include: 1) a ND control plane 624 (sometimes referred to as a control plane) comprising the compute resource(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the compute resource(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

Figure 6B:
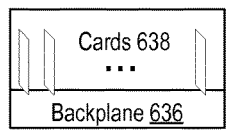
FIG. 6B illustrates an exemplary way to implement a special-purpose network device according to some embodiments of the invention.

FIG. 6B illustrates an exemplary way to implement the special-purpose network device 602 according to some embodiments of the invention. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein software 650, which contains compression software 627. During operation, the processor(s) 642 execute the software 650 to instantiate one or more sets of one or more applications 664A-R, including instances of compression software 627. While one embodiment does not implement virtualization, alternative embodiments may use different forms of virtualization—represented by a virtualization layer 654 and software containers 662A-R. For example, one such alternative embodiment implements operating system-level virtualization, in which case the virtualization layer 654 represents the kernel of an operating system (or a shim executing on a base operating system) that allows for the creation of multiple software containers 662A-R that may each be used to execute one of the sets of applications 664A-R. In this embodiment, the multiple software containers 662A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 654 represents a hypervisor (sometimes referred to as a virtual machine monitor (VMM)) or a hypervisor executing on top of a host operating system; and 2) the software containers 662A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 664A-R, as well as the virtualization layer 654 and software containers 662A-R if implemented, are collectively referred to as software instance(s) 652. Each set of applications 664A-R, corresponding software container 662A-R if implemented, and that part of the hardware 640 that executes them (be it hardware dedicated to that execution and/or time slices of hardware temporally shared by software containers 662A-R), forms a separate virtual network element(s) 660A-R.

The virtual network element(s) 660A-R perform similar functionality to the virtual network element(s) 630A-R—e.g., similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 662A-R differently. For example, while embodiments of the invention are illustrated with each software container 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 662A-R to VNEs also apply to embodiments where such a finer level of granularity is used.

In certain embodiments, the virtualization layer 654 includes a virtual switch that provides similar forwarding services as a physical Ethernet switch. Specifically, this virtual switch forwards traffic between software containers 662A-R and the NIC(s) 644, as well as optionally between the software containers 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

Figure 6C:
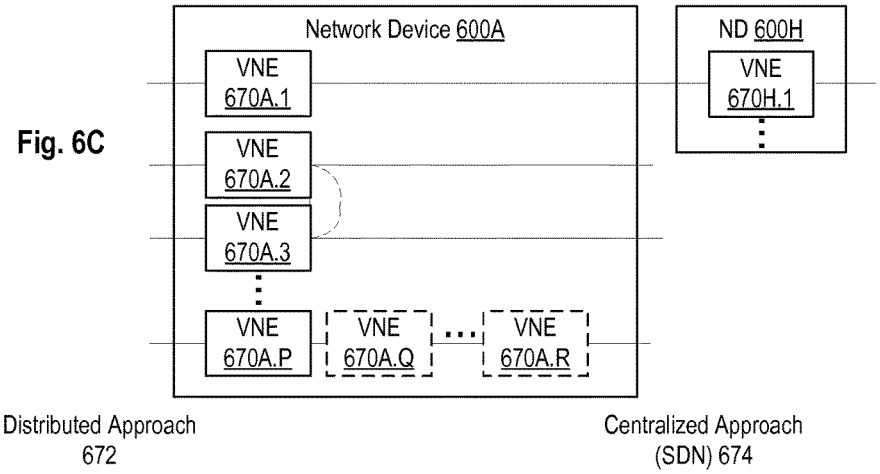
FIG. 6C illustrates various exemplary ways in which virtual network elements (VNEs) may be coupled according to some embodiments of the invention.

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service— e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the software containers 662A-R may operate as servers; the same would be true for the hybrid network device 606; in the case of the special-purpose network device 602, one or more such servers could also be run on a virtualization layer executed by the compute resource(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 6D:
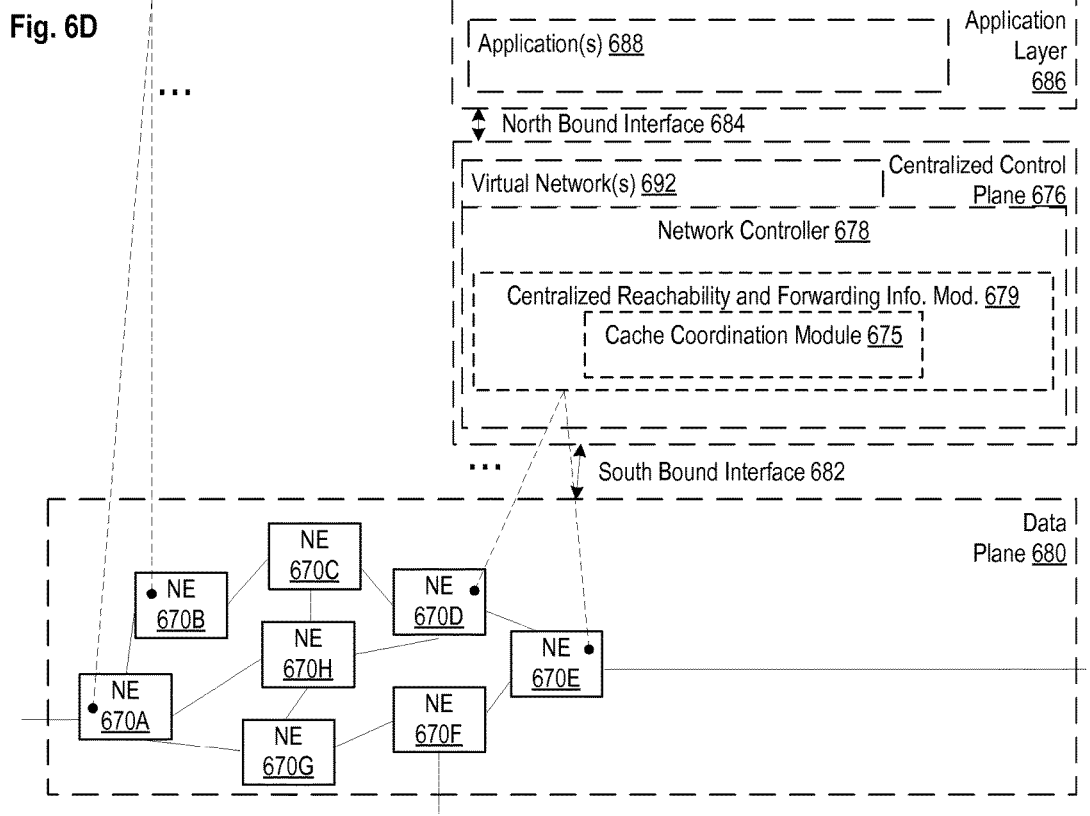
FIG. 6D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 670A-H (e.g., the compute resource(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general purpose network device 604 and the hybrid network device 606. In the distributed approach, the caches of the network elements are synchronized through communications between themselves or communicating with a network management system (NMS).

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs. The centralized reachability and forwarding information module 679 contains a cache coordination module 675. Cache coordination module 675 coordinates cache synchronization of network elements within the network. The cache content and the identification/content of the duplication features need to be synchronized, and cache coordination module 675 communicates network elements within the network and make it happen.

Where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the compute resource(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach).

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

Figure 6E:
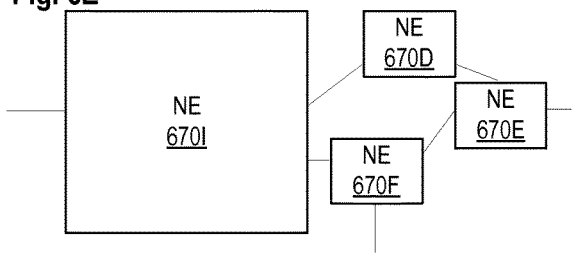
FIG. 6E illustrates the simple case of where each of the NDs implements a single NE, but a centralized control plane has abstracted multiple of the NEs in different NDs into (to represent) a single NE in one of the virtual network(s), according to some embodiments of the invention.
Figure 6F:
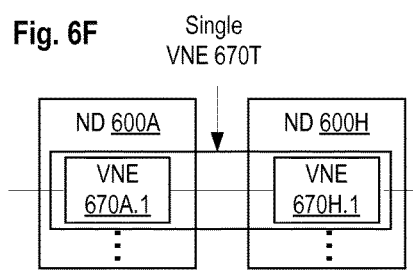
FIG. 6F illustrates a case where multiple VNEs are implemented on different NDs and are coupled to each other, and where a centralized control plane has abstracted these multiple VNEs such that they appear as a single VNE within one of the virtual networks, according to some embodiments of the invention

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 670I in one of the virtual network(s) 692 of FIG. 6D, according to some embodiments of the invention. FIG. 6E shows that in this virtual network, the NE 670I is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 680, the packet (or a subset of the packet header and content) is typically forwarded to the centralized control plane 676. The centralized control plane 976 will then program forwarding table entries into the data plane 680 to accommodate packets belonging to the flow of the unknown packet. Once a specific forwarding table entry has been programmed into the data plane 680 by the centralized control plane 676, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Each VNE (e.g., a virtual router, a virtual bridge (which may act as a virtual switch instance in a Virtual Private LAN Service (VPLS) (RFC 4761 and 4762) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

The operations of the flow diagrams FIGS. 4 and 5 are described with reference to the exemplary embodiment of FIGS. 1-3 and 6. However, it should be understood that the operations of flow diagrams can be performed by embodiments of the invention other than those discussed with reference to the exemplary embodiment of FIGS. 1-3 and 6, and the exemplary embodiment of FIGS. 1-3 and 6 can perform operations different than those discussed with reference to the flow diagrams of FIGS. 4 and 5.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end system, a network device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in a network device for removing redundancy in packets, the method comprising:
   identifying sets of one or more consecutive bytes within a packet;
   for each of the sets of one or more consecutive bytes within the packet,
      dividing the one or more consecutive bytes into a plurality of non-overlapping, consecutive segments;
      generating a segment feature for each of the plurality of non-overlapping, consecutive segments through application of a plurality of cryptographic hash functions with different random seeds, each seed for one of the plurality of non-overlapping, consecutive segments;
      generating a single duplication feature based on a combination of the segment features for the plurality of non-overlapping, consecutive segments; and
      generating a single compressed string when a predetermined condition is met, based on a comparison of the single duplication feature and a set of stored duplication features; and
   sending the generated single compressed strings toward the packet's destination.

2. The method of claim 1, wherein the sets of one or more consecutive bytes are equal in bit length.

3. The method of claim 1, wherein the plurality of non-overlapping, consecutive segments are equal in bit length.

4. The method of claim 1, wherein the generating the single duplication feature comprises setting a value of each bit position of the single duplication feature based on values at corresponding bit positions of each of the segment features.

5. The method of claim 1, wherein the generating the single compressed string based on the comparison of the single duplication feature and the set of stored duplication features comprises:
comparing the single duplication feature to the set of stored duplication features, each corresponding to one stored string of one or more consecutive bytes in a cache of the network device;
upon determining that the predetermined condition is met, wherein the predetermined condition is that difference between the single duplication feature and a stored duplication feature is no more than that of the single duplication feature and any other stored duplication feature of the set, and the difference is below a predetermined number of bits, generating the single compressed string based on the difference and the stored duplication feature; and
upon determining that the difference between the single duplication feature and each of the set of stored duplication features fails to meet the predetermined condition, maintaining the set of one or more consecutive bytes within the packet intact.

6. The method of claim 1, wherein each single compressed string is surrounded by a character sequence.

7. The method of claim 1, wherein all the sets of one or more consecutive bytes are within a payload of the packet.

8. The method of claim 4, wherein the value of each bit position of the single duplication feature is set to be one upon determining that a majority of the values at corresponding bit positions of the segment features are one, and the value of each bit position is set to be zero otherwise.

9. The method of claim 5, wherein each single compressed string includes a representation of the stored duplication feature and the difference.

10. The method of claim 5, further comprising:
storing the single duplication feature to replace a stored duplication feature whose corresponding stored string of one or more consecutive bytes is least utilized in the cache.

11. The method of claim 5, wherein the set of stored duplication features is stored in the cache.

12. A non-transitory machine-readable medium having instructions stored therein, which when executed by a processor, cause the processor to perform operations in a network device, the operations comprising:
identifying sets of one or more consecutive bytes within a packet;
for each of the sets of one or more consecutive bytes within the packet,
dividing the one or more consecutive bytes into a plurality of non-overlapping, consecutive segments;
generating a segment feature for each of the plurality of non-overlapping, consecutive segments through application of a plurality of cryptographic hash functions with different random seeds, each seed for one of the plurality of non-overlapping, consecutive segments;
generating a single duplication feature based on a combination of the segment features for the plurality of non-overlapping, consecutive segments; and
generating a single compressed string when a predetermined condition is met, based on a comparison of the single duplication feature and a set of stored duplication features; and
sending the generated single compressed strings toward the packet's destination.

13. The non-transitory machine-readable medium of claim 12, wherein the generating the single duplication feature comprises setting a value of each bit position of the single duplication feature based on values at corresponding bit positions at each of the segment features.

14. The non-transitory machine-readable medium of claim 12, wherein the generating the single compressed string based on the comparison of the single duplication feature and the set of stored duplication features comprises:
comparing the single duplication feature to the set of stored duplication features, each corresponding to one stored string of one or more consecutive bytes in a cache of the network device;
upon determining that the predetermined condition is met, wherein the predetermined condition is that difference between the single duplication feature and a stored duplication feature is no more than that of the single duplication feature and any other stored duplication feature of the set, and the difference is below a predetermined number of bits, generating the single compressed string based on the difference and the stored duplication feature; and
upon determining that the difference between the single duplication feature and each of the set of stored duplication features fails to meet the predetermined condition, maintaining the set of one or more consecutive bytes within the packet intact.

15. The non-transitory machine-readable medium of claim 12, wherein each single compressed string is surrounded by a character sequence.

16. The non-transitory machine-readable medium of claim 12, wherein all the sets of one or more consecutive bytes are within a payload of the packet.

17. The non-transitory machine-readable medium of claim 14, wherein each single compressed string includes a representation of the stored duplication feature and the difference.

18. The non-transitory machine-readable medium of claim 14, the operations further comprising:
storing the single duplication feature to replace a stored duplication feature whose corresponding stored string of one or more consecutive bytes is least utilized in the cache.

* * * * *